United States Patent

[11] 3,608,952

| [72] | Inventor | Robert G. Simmer |
| | | Hamilton, Ohio |
| [21] | Appl. No. | 16,390 |
| [22] | Filed | Mar. 4, 1970 |
| [45] | Patented | Sept. 28, 1971 |
| [73] | Assignee | Ward Manufacturing, Inc. |
| | | Hamilton, Ohio |

[54] CAMPING TRAILER
6 Claims, 4 Drawing Figs.
[52] U.S. Cl..................................................... 296/23, 52/66
[51] Int. Cl........................................................ B60p 3/34
[50] Field of Search.......................................... 296/23, 27; 52/66

[56] References Cited
UNITED STATES PATENTS
| 3,499,677 | 3/1970 | Daniels.......................... | 296/23 |
| 3,514,148 | 5/1970 | Hunter........................... | 296/23 |

*Primary Examiner*—Philip Goodman
*Attorney*—Marechal, Biebel, French & Bugg

ABSTRACT: A camping trailer has a wheel-supported body, extendible beds and a collapsible cover including a substantially rigid plastic roof with a depending peripheral skirt. A framelike metal trim member is clamped on a curved lower edge portion of the skirt and provides for sliding movement of the skirt relative to the trim member in response to thermal expansion and contraction of the roof. The trim member also includes an inner portion to which flexible wall material is uniformly secured and provides spaces at the corners to permit free expansion and contraction of the roof.

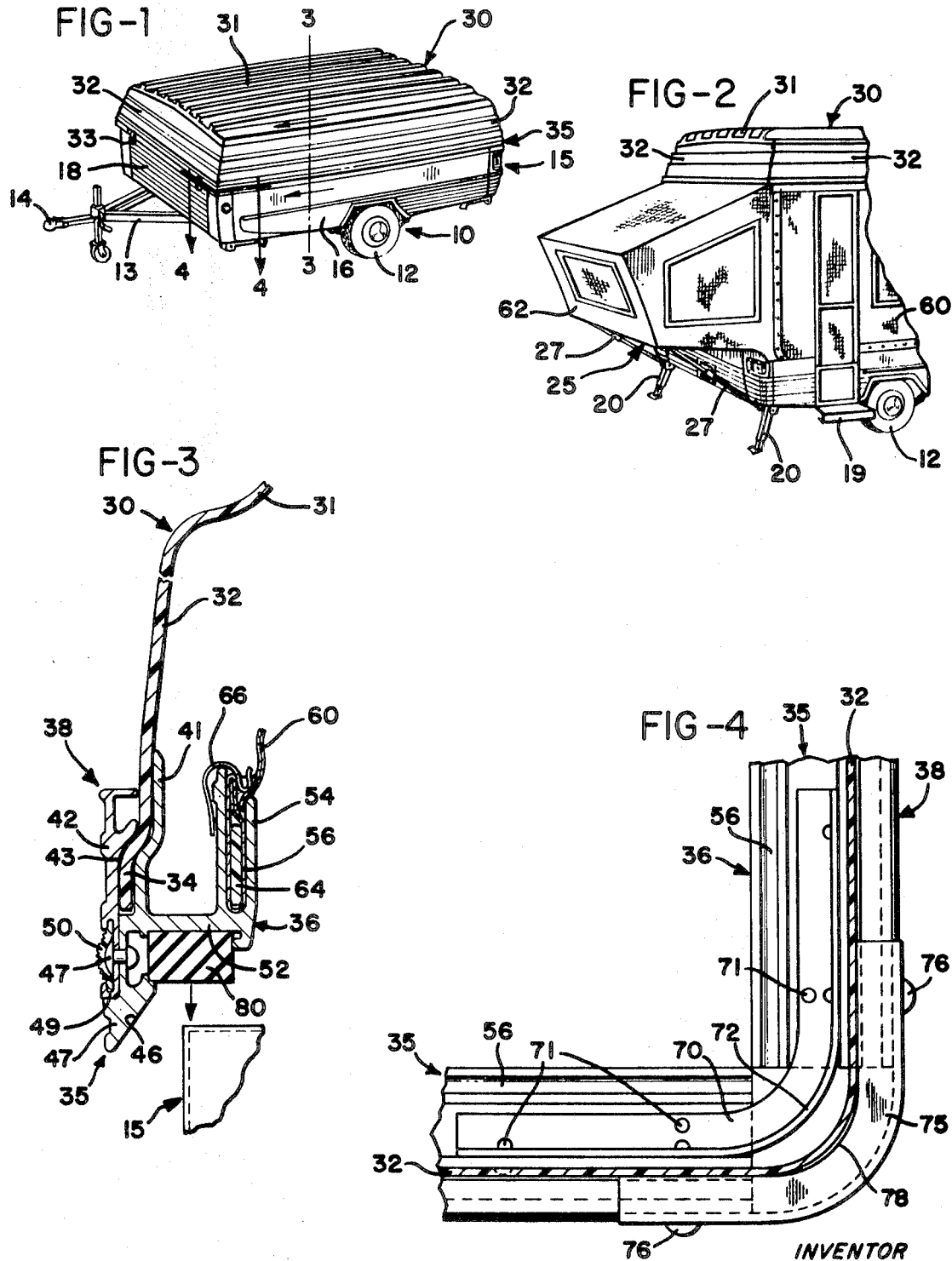

CAMPING TRAILER

BACKGROUND OF THE INVENTION

In a camping vehicle or trailer as disclosed in U.S. Pats. Nos. 3,456,078 and 3,456,979 which issued to the assignee of the present invention, a wheel-supported trailer body having a generally rectangular configuration, supports a pair of horizontal beds for laterally sliding movement between retracted positions overlying the trailer body and extended positions projecting outwardly from the ends of the body. The beds and the body are connected by flexible canvas sidewalls to a generally rectangular rigid top which is movable between a collapsed position covering the trailer body and an elevated position in response to movement of the beds.

Preferably, the top is formed by vacuum forming a sheet of thermoplastic material and comprises a ribbed roof surrounded by a depending framelike skirt. Usually, a metal framelike trim member is secured to the lower peripheral edge portion of the depending skirt by a series of peripherally spaced rivets or screws. The trim member carries a resilient gasket which is adapted to engage the upper surfaces of the beds or the body when the top is moved to its collapsed position. Due to the substantial difference in the coefficient of thermal expansion of the plastic roof relative to the metal trim member, it has been found that substantial stresses develop within the skirt of the plastic top when the top is subjected to a substantial change in temperature. The differential expansion and contraction is so great that occasionally a crack will develop in the skirt of the cover particularly in cold weather, usually originating at a hole in the skirt which receives a rivet securing the trim member to the skirt.

SUMMARY OF THE INVENTION

The present invention is directed to a camping trailer of the type outlined above and which provides an improved assembly of the metal trim member on the lower peripheral edge portion of a plastic cover or top. The assembly enables the top to expand and contract substantially more than the trim member and without creating undesirable stresses in the plastic top. The invention also provides for simplified assembly of the trim member on the skirt of the plastic top as well as simplified assembly of the flexible canvas sidewalls to the trim member.

In accordance with a preferred embodiment of the invention, the lower peripheral edge portion of the cover skirt has an S-curved, cross-sectional configuration providing an outwardly offset depending lip. The trim member is formed in two complementary sections each formed of extruded aluminum. The inner and outer sections of the trim member define a peripheral slot having an S-curved, cross-sectional configuration and which receives the lower peripheral edge portion of the skirt when the inner and outer sections of the trim member are clamped together by a series of peripherally spaced rivets.

The outer trim section incorporates a peripheral channel or groove which receives a flexible strip for covering the heads of the rivets. The inner trim section includes an integral peripheral portion having a narrow U-shaped slot. The upper peripheral edge portion of the canvas wall material is wrapped around a rigid strip which is retained within the U-shaped slot by peripherally spaced spring clips, thereby forming a continuous positive connection between the canvas and the trim member.

Other features and advantages of the invention will be apparent from the following description, the accompanying drawing and the appended claims.

BRIEF DESCRIPTION OF THE DRAWING

FIG. 1 is a perspective view of a camping trailer constructed in accordance with the invention and shown in its collapsed condition;

FIG. 2 is a fragmentary perspective view of the trailer shown in FIG. 1 and in its extended condition;

FIG. 3 is a fragmentary vertical section taken generally on the line 3—3 of FIG. 1; and FIG. 4 is a fragmentary section taken generally on the line 4—4 of FIG. 1.

DESCRIPTION OF THE PREFERRED EMBODIMENT

FIGS. 1 and 2 show a camping trailer including a chassis 10 with a pair of spring-mounted support wheels 12 and an extending tow bar 13 having a hitch 14 for attachment to a towing vehicle. A generally rectangular boxlike body 15 is mounted on the chassis 10 and includes opposite sidewalls 16 and opposite end walls 18. The right sidewall 16 is provided with a door 19 having a lower portion hinged to the body for movement between a position flush with the right sidewall and a lowered position (FIG. 2) where it forms a step for ascending into the body 15. Retractable stabilizing legs 20, as disclosed in U.S. Pat. No. 3,489,428, which issued to the assignee of the present invention, are mounted on the lower corners of the body 15 and are adapted to be lowered and extended (FIG. 2) for stabilizing the body after the trailer is parked at a camping site.

A pair of beds 25 (FIG. 2) are slidably mounted on the body 15 for horizontal movement between retracted positions (FIG. 1) and extended positions (FIG. 2) where the beds are provided with extendible braces 27 which extend upwardly from the legs 20. A rigid thermoplastic top or cover 30, having a rectangular configuration the same as the body 15, extends over the beds 25 when they are in their retracted positions and includes a ribbed roof 31 from which depends an integral peripheral skirt 32. The cover 30 is releasably attached to the sidewalls 16 and the end walls 18 of the body 15 by a plurality of toggle clamps 33 which engage the skirt 32.

As disclosed in above U.S. Pat. No. 3,456,978, each end of the cover 30 is pivotally connected by a pair of legs to torsion coil springs mounted on the inner corners of the corresponding bed 25. Thus to erect the trailer, the clamps 33 are released and the cover 30 is moved from its collapsed position (FIG. 1) to its elevated position (FIG. 2) in response to movement of the beds 25 from their retracted positions to their extended positions.

In accordance with the present invention, the skirt 32 of the rigid plastic cover 30 has an outwardly offset peripheral lip or lower edge portion 34 having an S-curved, cross-sectional configuration. A framelike arrangement of elongated trim members 35 are mounted on the lower peripheral edge portion 34 of the skirt 32, and each trim member 35 includes an inner section 36 and an outer section 38 each comprising an aluminum extrusion. The inner section 36 includes an upwardly projecting peripheral wall 41 having an S-curved, cross-sectional configuration. The wall 41 cooperates with an upwardly projecting wall 42 of the outer section 38 to define a groove or slot 43 having a curved, cross-sectional configuration conforming to the cross-sectional configuration of the lower edge portion 34 of the cover skirt 32.

Each inner section 36 also includes a depending peripheral wall portion 44 having a sloping peripheral guide surface 46. The wall portion 44 is secured to the corresponding outer section 38 by a series of peripherally spaced pop-type rivets 47, and the lower edge portion 34 of the skirt 32 is clamped between the inner and outer sections of the trim members. A longitudinally extending undercut groove 49 is formed within each of the outer trim sections 38 for receiving the heads of the rivets 47, and a flexible decorative trim strip 50 extends within the groove 49 around the periphery of the cover 30 so that the rivets 47 are not exposed.

Each inner trim section 36 further includes an inwardly projecting peripheral wall 52 which connects integrally with a peripherally extending, U-shaped portion 54 defining an upwardly facing slot 56. Flexible canvas walls 60 and 62 (FIG. 2) have their lower edge portions secured to the sidewalls 16 of the trailer body 15 and the outer edges of the beds 20, respectively. The upper edge portions of the canvas walls 60 and 62 are each hemmed around a rigid plastic retainer strip 64 which is inserted into the corresponding slot 56 to form a substantially continuous peripheral connection between the canvas walls 60 and 62 and the inner sections 36 of the trim members 35. A series of longitudinally spaced spring clips 66 are mounted on the inner portion 54 of each trim section 36 and serve to secure the corresponding retainer strip 64 within the peripheral slot 56 as shown in FIG. 3.

Referring to FIG. 4, at each corner of the cover 30, the adjacent ends of the side and end trim members 35 are rigidly secured by a right-angle corner bracket 70 and a series of rivets 71 which extend through the walls 41 and 52 of the inner trim section 36. Each corner bracket 70 has an outer curved surface 72 with a radius somewhat larger than the normal radius of the corners of the skirt 32. A corner cap member 75, formed of aluminum sheet metal, overlies each corner of the cover skirt 32 and is secured to the adjacent ends of the outer trim sections 38 by rivets 76. Each cap 75 has an inner curved surface 78 with a radius somewhat smaller than the radius of the corresponding curved surface 72 of the adjacent corner bracket 70.

Referring to FIG. 3, a framelike resilient gasket 80 of rectangular cross section, is cemented to the lower surfaces of the inner trim sections 36. The gasket 80 is adapted to engage the upper peripheral surfaces of the body walls 16 and 18 when the cover 30 is moved to its collapsed position shown in FIG. 1 to form an effective fluidtight seal between the cover 30 and the body 15 when the toggle clamps 33 are latched.

From the drawing and the above description, it is apparent that a camping vehicle or trailer constructed in accordance with the invention provides desirable features and advantages. For example, the connection between the lower peripheral edge portion of the cover skirt 32 and the side and end trim members 35 enables the skirt 32 to slide within the trim members 35 when the cover 30 is subjected to a change in temperature. Since the relative differential in thermal expansion and contraction between the plastic materials forming the cover 30 and the metal trim members 35 is in the order of 10:1, substantial sliding movement occurs between the lower peripheral skirt portion 34 and the trim members 35 when the temperature of the cover 30 varies, for example, between −10° F. and 110°F.

The connection of the trim members 35 at each of the corners of the cover 30 is also important. That is, the relative difference in the radius of the surfaces 72 and the radius of the surfaces 78 on the cap member 75 provides a space in which the corners of the cover skirt 32 can expand and contract without creating undesirable stresses within the cover 30. Another important advantage is the simplified assembly of the canvas walls 60 and 62 onto the trim members 35. That is, the retainer strips 64 are merely inserted into the hemmed edge portions of the canvas walls and are then inserted into the slots 56 where they are retained by the clips 66. This forms a continuous and uniform peripheral connection between the canvas walls and the trim members 35 to avoid any significant stress concentrations in the canvas walls.

While the camping trailer structure herein described constitutes a preferred embodiment of the invention, it is to be understood that the invention is not limited to this precise form of structure, and that changes may be made therein without departing from the scope of the invention which is defined in the appended claims.

What is claimed is:

1. A camping trailer comprising a generally rectangular boxlike body having opposite sidewalls and opposite end walls, wheel means supporting said body, bed means mounted on said body and movable between a retracted position within said body and an extended position projecting outwardly from said body, a cover movable between a collapsed position adjacent said body and an elevated position spaced substantially above said body, said cover for said body including a substantially rigid generally rectangular plastic roof having a depending peripheral skirt, a framelike metal trim member mounted on the lower edge portion of said skirt, and means for slidably mounting said trim member on said skirt for sliding movement of said skirt relative to said trim member in response to thermal expansion and contraction of said roof.

2. A camping trailer as defined in claim 1 wherein said trim member comprises an inner section and an outer section defining a longitudinally extending slot receiving the lower edge portion of said skirt, and said slot and said lower edge portion of said skirt have complementary curved, cross-sectional configurations forming said means retaining said trim member on said skirt.

3. A camping trailer as defined in claim 2 wherein said slot and said lower edge portion of said skirt have S-curved, cross-sectional configurations.

4. A camping trailer as defined in claim 2 including a plurality of longitudinally spaced fasteners securing said inner and outer sections of said trim member, means defining a longitudinally extending groove within said outer section adjacent said fasteners, and a flexible strip extending longitudinally within said groove covering said fasteners.

5. A camping trailer as defined in claim 1 wherein said inner trim section includes a longitudinally extending inner portion defining a longitudinally extending second slot, a flexible sidewall member having a lower portion attached to said body and an upper portion projecting into said second slot, and means for retaining said upper portion of said sidewall within said second slot.

6. A camping trailer as defined in claim 1 wherein said trim member includes at least one corner angle bracket having a curved outer surface, a trim corner cap overlying said bracket and having a curved inner surface with a radius less than the radius of said outer surface, and said skirt includes a corner portion extending between said outer and inner surfaces to aid in providing for thermal expansion and contraction of said cover relative to said trim member.